Nov. 14, 1944.   A. C. DAVIDSON   2,362,745
METHODS OF AND APPARATUS FOR MAKING AIRPLANE PROPELLER BLADES
Filed Oct. 30, 1941   5 Sheets-Sheet 1
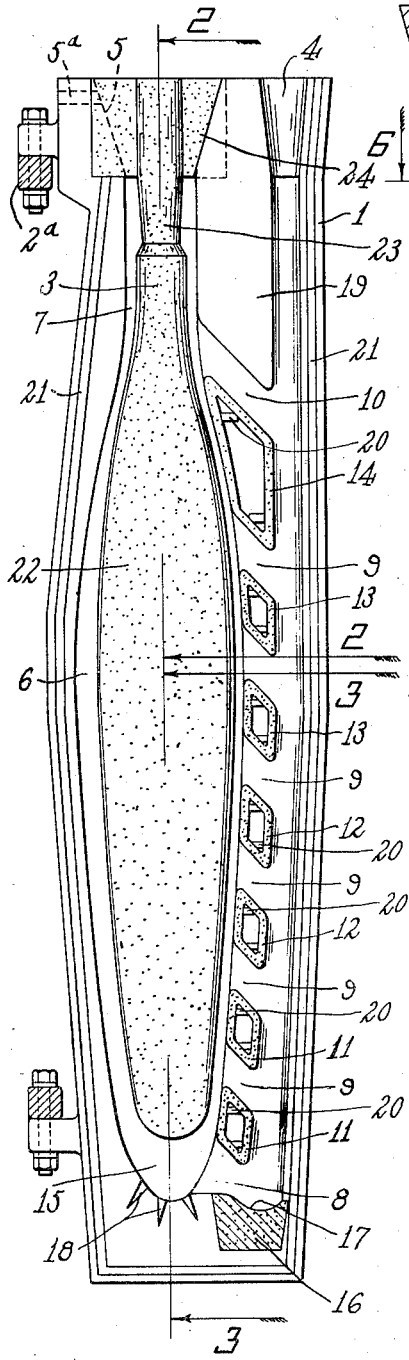
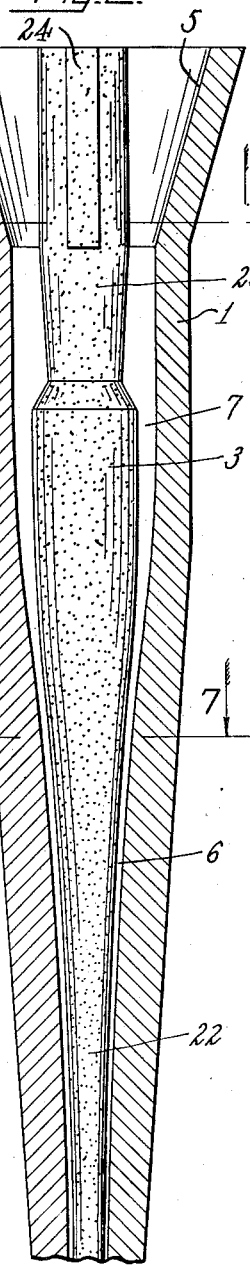
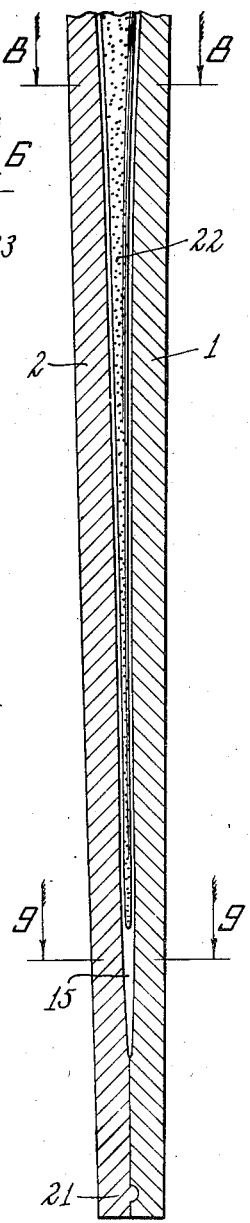
Inventor
Arthur C. Davidson, Deceased
By Avis Cole Davidson, Executrix Nov. 14, 1944.  A. C. DAVIDSON  2,362,745
METHODS OF AND APPARATUS FOR MAKING AIRPLANE PROPELLER BLADES
Filed Oct. 30, 1941  5 Sheets-Sheet 2
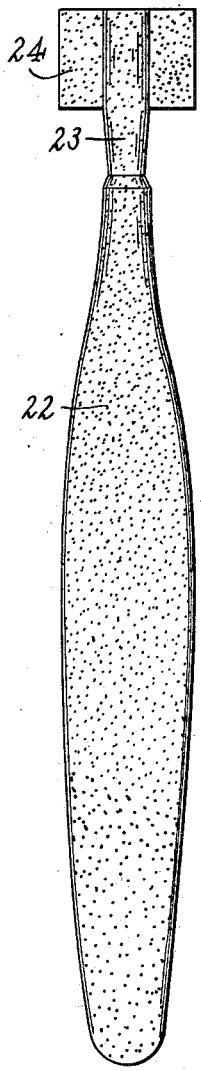
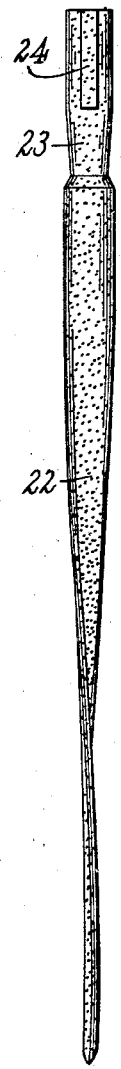
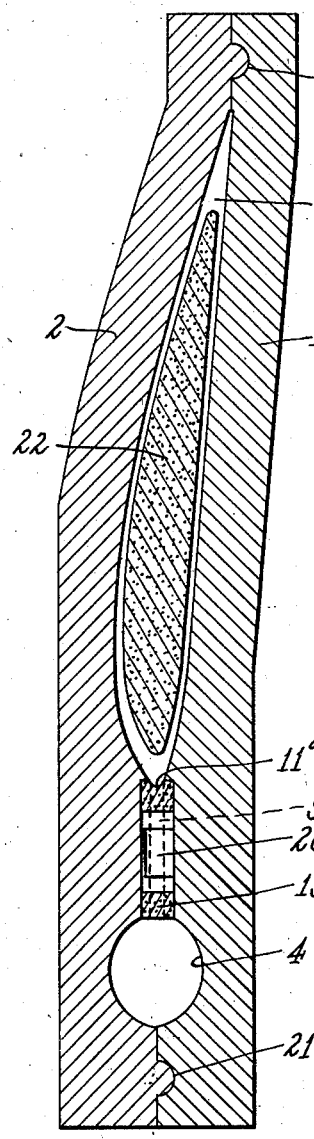
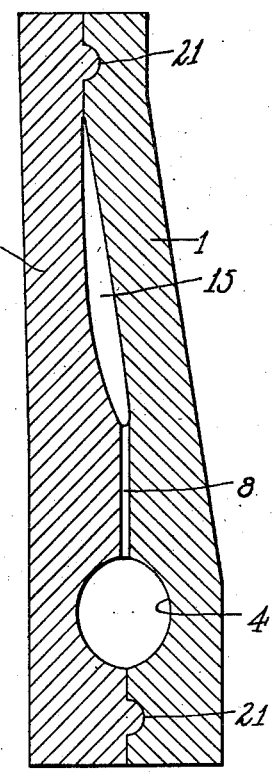
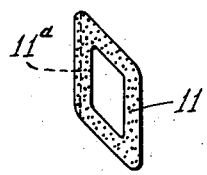
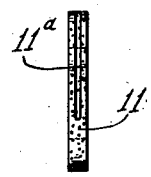
Inventor
Arthur C. Davidson, Deceased
By Avis Cole Davidson, Executrix
Attorney Nov. 14, 1944. A. C. DAVIDSON 2,362,745
METHODS OF AND APPARATUS FOR MAKING AIRPLANE PROPELLER BLADES
Filed Oct. 30, 1941   5 Sheets-Sheet 3
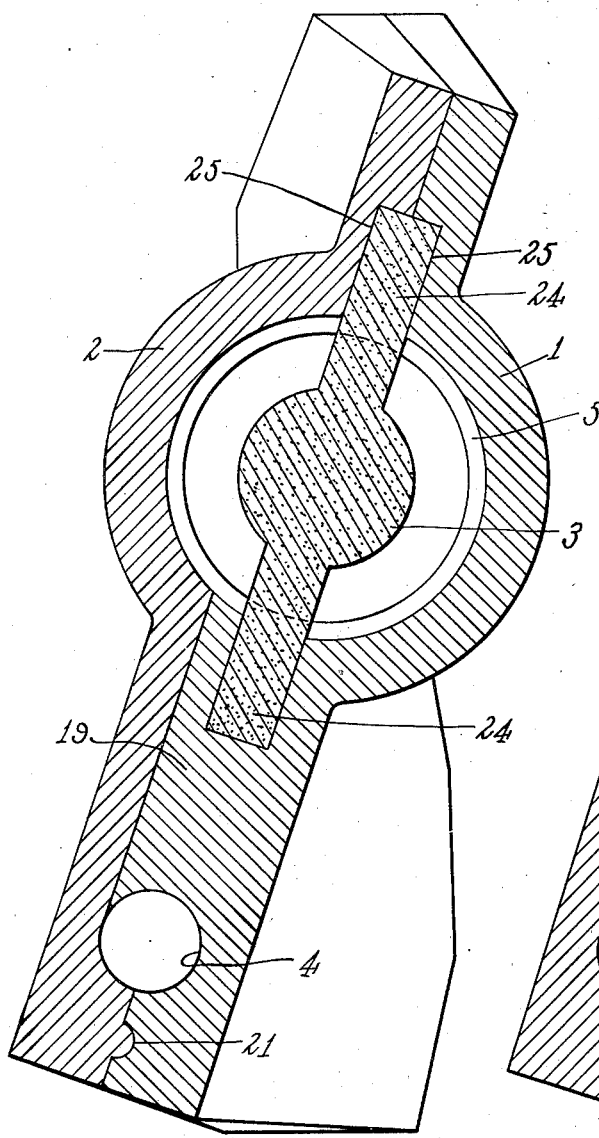
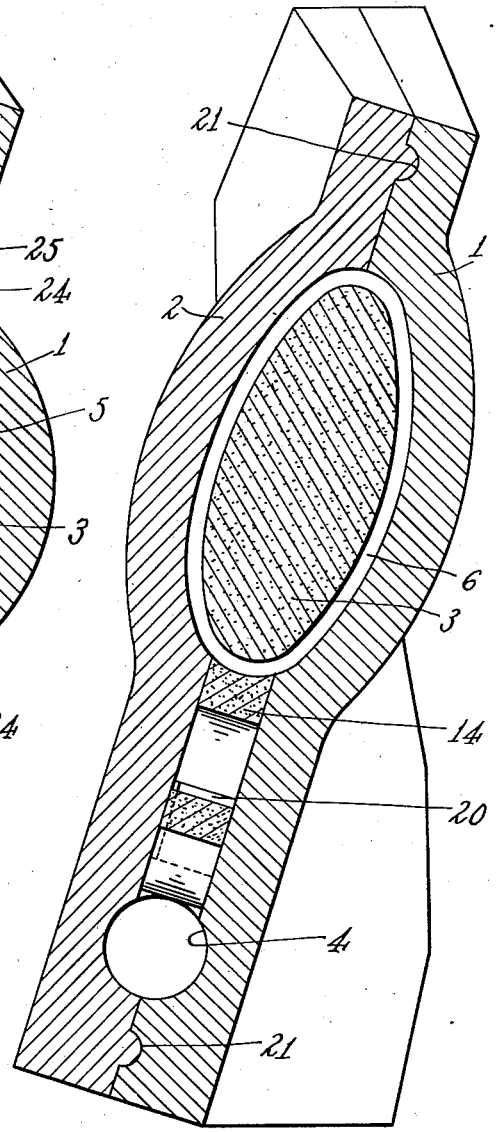
Inventor
Arthur C. Davidson, Deceased
By Avis Cole Davidson, Executrix
By
Attorney

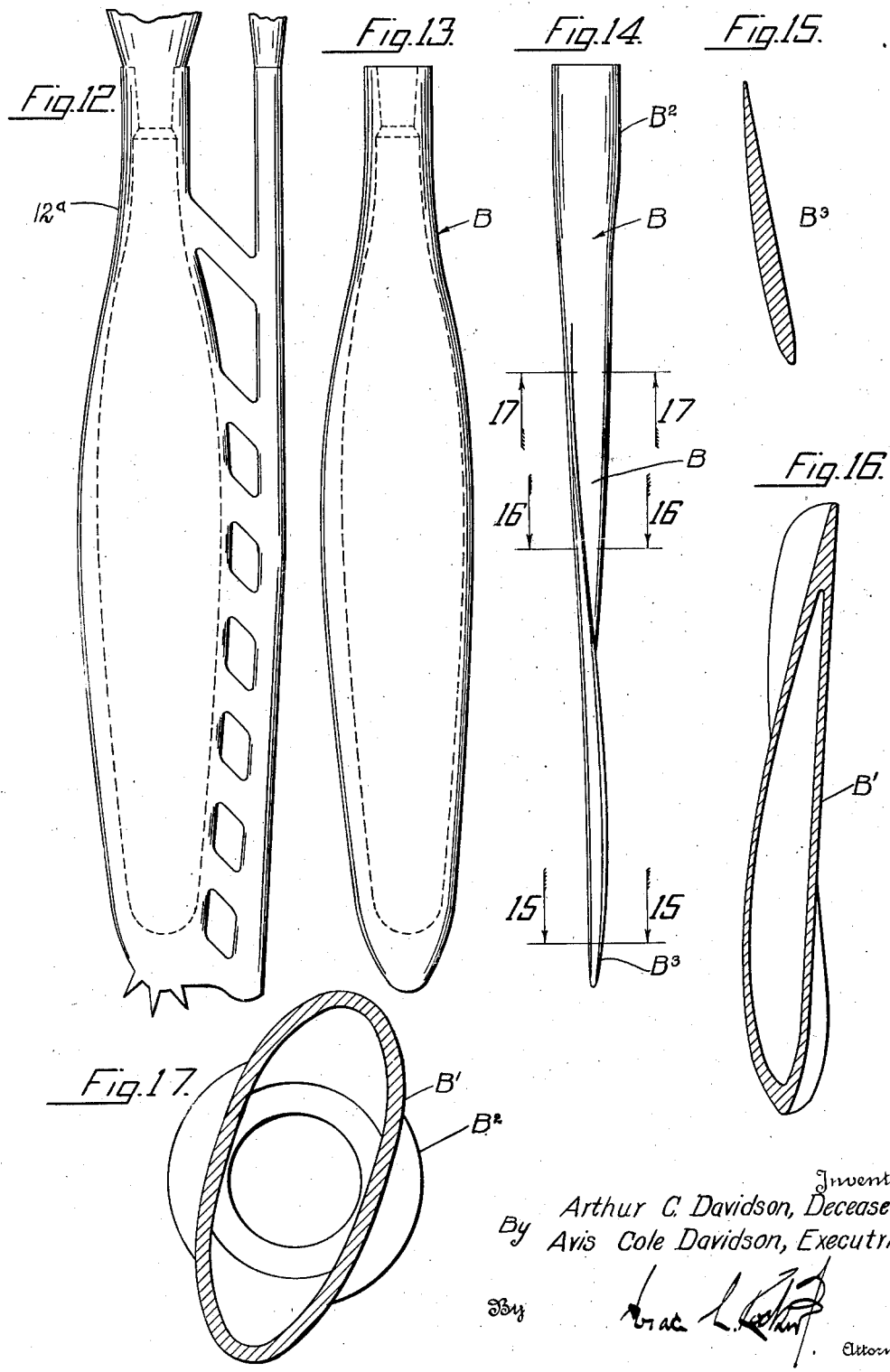

Nov. 14, 1944.  A. C. DAVIDSON  2,362,745
METHODS OF AND APPARATUS FOR MAKING AIRPLANE PROPELLER BLADES
Filed Oct. 30, 1941  5 Sheets-Sheet 5
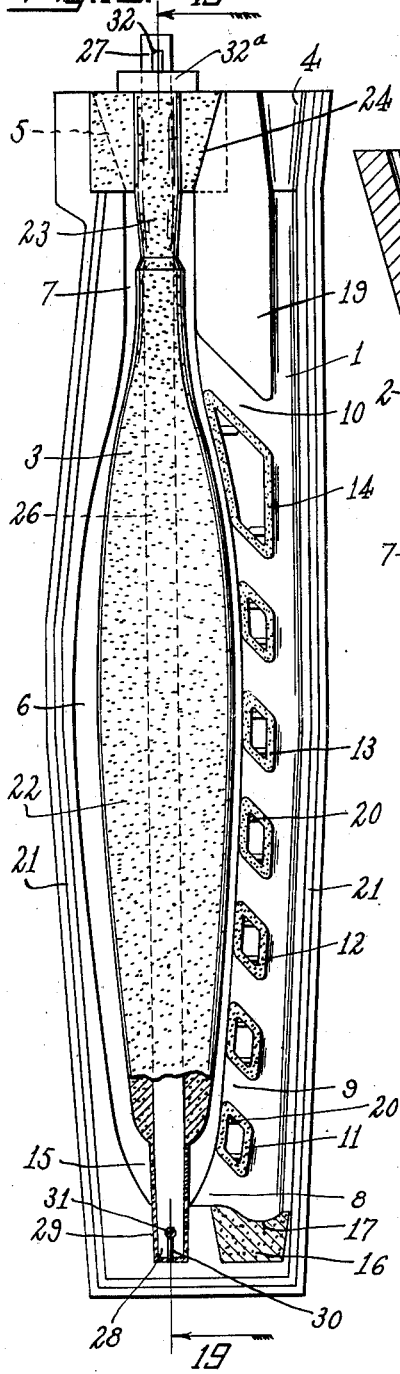
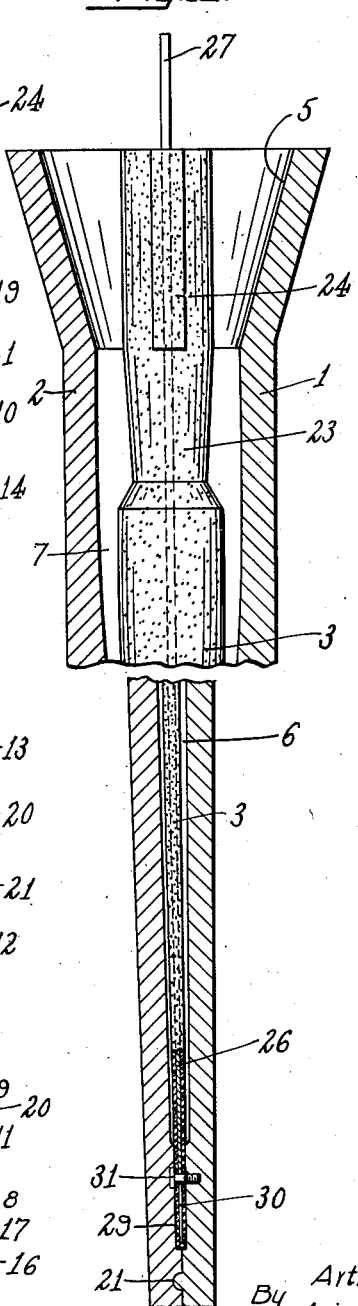
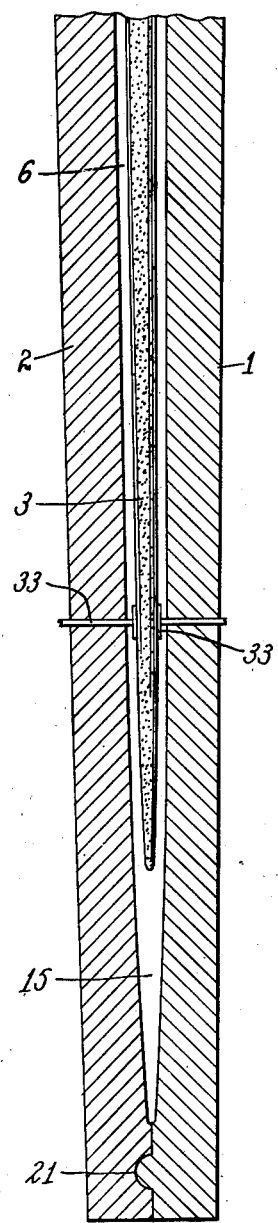
Inventor
Arthur C. Davidson, Deceased
By Avis Cole Davidson, Executrix
Attorney Patented Nov. 14, 1944

2,362,745

UNITED STATES PATENT OFFICE 2,362,745

METHOD OF AND APPARATUS FOR MAKING AIRPLANE PROPELLER BLADES

Arthur C. Davidson, deceased, late of Collinsville, Conn., by Avis Cole Davidson, executrix, Collinsville, Conn.

Application October 30, 1941, Serial No. 417,168

7 Claims. (Cl. 22—126)

This invention relates to methods of and apparatus for making airplane propeller blades.

Due to their conformation and the need for precision manufacture in order to produce a properly balanced blade, as well as the fact that such blades run from approximately seven to eleven feet in length and include exceedingly thin marginal portions at the tip and along the edges thereof, great difficulty has heretofore been experienced in producing such blades of sufficient quality to meet Army and Navy requirements. As a result, their manufacture has been both an exceedingly slow and exceedingly expensive process, in such manner as thereby to make the production of such blades a very serious bottleneck in airplane production.

It has heretofore been the practice to make such blades in solid form of aluminum mixtures, such as Duralumin, cast in ingots and subsequently rolled and forged into the desired shape, or to form hollow steel blades in either of two ways, either from a plurality of flat forged and rolled plates, separately formed into the desired and complemental shapes and then welded and brazed together, or from tubular stock by forging and shaping the same into the desired blade shape. The blades produced and also the methods and apparatus used in making the same in each of the above ways, have, however, been open to numerous objections.

Thus, the solid aluminum blades are incapable of withstanding the pressures developed in high speed pursuit and diving maneuvers without distortion, such, for example, as the taking on of a permanent set due to high pressures. Further, such blades, when struck by machine gun bullets, have a tendency to fracture transversely and sometimes longitudinally. It is found that these difficulties are generally due to a too low transverse impact value and yield point, too low cohesive or cleavage strength at the grain boundaries. embrittled microscopical areas due to banding or directional solidification at ingot solidification and/or during the rolling and forging operation, and further to the presence of both microscopical and optical voids caused by various non-metallic and gaseous elements and copper or aluminum oxides which form fissures when the metal is rolled or forged. Further, such solid aluminum blades have required, in addition to the apparatus used in casting the ingots, mechanism for subsequently forging and rolling the same into bars, and also for thereafter forging the same into the rough form of a propeller blade with many subsequent time consuming additional operations, in such manner as thereby not only to make the process of manufacture very slow and expensive, but also, as a result of this process including the ingot casting and subsequent forging, rolling and other operations involved, to cause the defects in the product referred to above.

Hollow steel blades, which are now preferred due to their superiority in flight performance, are even more difficult, slow and expensive to manufacture with known processes and apparatus. In making fabricated hollow steel blades, as a result of the forging and rolling of the component flat steel plates, longitudinal bandings are clearly shown at 150 magnifications, even after the flat bars have been heat treated by normalizing and additionally annealed. Accordingly, after subsequent milling to a taper starting at one-half inch at the heavier end down to one-eighth inch thickness at the other end of the five to seven feet long blades, and subsequent blanking to form and cold forming into the complementary or component so-called camber plate and thrust plate, approximately 30% of the plates are rejected due to surface checks, cracks or tears which appear by mere optical inspection; these defects being wholly due to the weak cleavage or embrittled areas adjacent to the bandings. After the formation of these plates, they are then placed in a welding jig, and a weld of approximately one inch wide by one-fourth inch deep is made through the center of the cold formed shank and along both ends of the two plates, the weld having a total length of from ten to twelve feet. After this external welding, the blade is then copper brazed along its inside length to fill the cavities with copper, which results in wholly unpredictable depths of decarburization, in such manner as to make it impossible to depend upon resistance to failures from vibration or static fatigue in the areas adjacent the weld or the brazing. Following welding and brazing, the blade is then ground and the shank machined, and approximately an additional 30% are rejected at the magniflux test, due to checks, cracks or tears formed during the cold forming, but which were not optically visible. Thereafter, an additional 20% of the blades are returned and repaired, due to defects either in the weld or in the brazing, so that on the average only twenty finished blades out of one-hundred wholly or partially manufactured, pass the initial standard Army and Navy inspection. Of course, also, the cost for labor, materials and equipment is extremely high, while the manufacture is very slow, the labor, for example, needed for the manufacture of such a fabricated eleven foot blade approximating two men per month.

The hollow steel blades formed from tubular stock are considered inferior to the above described fabricated hollow steel blades in the light of actual flying tests, and the latter are, accordingly, preferred. Further, such blades made from tubing, regardless of the composition, have the defects in micro-structure mentioned above, while brazing on the inside is necessary, as well as external welding at the tail-end.

This invention has among its objects to provide an improved propeller blade free from the defects of the finished products heretofore referred to, while requiring only a small fraction of the time, labor, equipment, and cost, heretofore considered the minimum possible in producing such blades, all in such manner as thereby to make it possible materially to expedite the possible production of such blades.

A further object of the invention is to provide an improved process of making such blades whereby the above advantages are obtained and whereby it is made possible to utilize steels of any desired composition and also aluminum mixtures as well as copper mixtures, while producing a hollow blade which is markedly superior in numerous respects, and while also making possible the production of improved blades of steel, aluminum or copper mixtures and in a wholly new and stronger hollow cast form heretofore not obtainable, so far as has been devised, with any material in a propeller blade.

A still further object of the invention is to provide an improved apparatus and, more particularly, an improved permanent mold structure wherein such improved blades may be cast in carrying out the casting step of this improved process.

These and other objects and advantages of these improvements will, however, hereinafter more fully appear.

In the accompanying drawings have been shown for purposes of illustration three forms of molding apparatus which may be used in carrying out the improved process.

In these drawings:

Figure 1 is a side elevation of the main mold in vertical casting position; the complemental mold being removed to facilitate illustration and the core being illustrated in position ready for pouring;

Fig. 2 is an enlarged longitudinal section, substantially quarter size and on line 2—2 of a portion of Figure 1, both parts of the mold being shown with the core in elevation and in operative position therebetween;

Fig. 3 is a similar enlarged view on line 3—3 of Figure 1;

Fig. 4 is a side elevation of the core removed from the mold;

Fig. 5 is a similar view showing an edgewise view of the core;

Fig. 6 is a transverse section on line 6—6 of Figure 2 through the shank portion of the mold and core;

Fig. 7 is a like section on line 7—7 of Figure 2 at an intermediate point near the shank portion;

Fig. 8 is a like section on line 8—8 of Figure 3 at a point substantially midway between the ends of the blade;

Fig. 9 is a similar section on line 9—9 of Figure 3 at a point in the tip or tail portion of the blade;

Fig. 10 is a detail of one of the collapsible core members, shown in Figure 1, when removed from the mold;

Fig. 11 is an end elevation of this core member;

Fig. 12 is a side elevation of a blade blank when removed from the mold;

Fig. 13 is a like view of the blade when trimmed down to shape, the hollow interior being indicated by dotted lines;

Fig. 14 is an edgewise view of the trimmed blade shown in Figure 13;

Fig. 15 is a section of the blade on line 15—15 of Figure 14, suitably enlarged;

Fig. 16 is a section of this blade on line 16—16 of Figure 14, similarly enlarged;

Fig. 17 is a section of the blade on line 17—17 of Figure 14, similarly enlarged;

Fig. 18 is a view corresponding to Figure 1 and showing a modified construction including a reenforced core and the latter supported at the tip end thereof in the mold;

Fig. 19 is an enlarged longitudinal section on line 19—19 of Figure 18, corresponding to Figures 2 and 3 when combined, but with a portion of the core shown in section and the intermediate portions of the mold members and the core broken away to facilitate illustration, and Fig. 20 is an enlarged view similar to the lower end of Figure 19 but showing another modified construction for supporting the tip end of the core.

In its broader aspects, the invention includes (1) an improved preparation of the metal to be poured whereby an improved pouring metal is obtained adapted to function in a new manner when in a mold; (2) the subsequent pouring and casting of the metal in an improved manner enabling such structural defects as banding and carbide segregations to be avoided and an improved structure of the crystal bodies to be obtained at solidification in conformity with the contour of the casting and while casting the hollow propeller blade of, or substantially of, the unmachined finished contour thereof, and (3) the subsequent finishing of the cast hollow blade after its removal from the mold; all as hereinafter more specifically described and in such manner as to enable improved hollow propeller blades to be produced in quantity production within normal time and expense limits, and while making possible, as a result of casting, the use of metals of a composition wholly incapable of being utilized heretofore in previous methods of forming such blades which required welding, brazing or distortion of the blade in cold or hot forming operations.

Referring first to this improved process as applied to steel blades, it will be understood that the desirable composition of the finished steel blade may be of any S. A. E. range to be specified. A preferred S. A. E. standard is 4330. However, as a result of the improved process of casting the blade, as hereinafter described, it is possible to utilize alloys of the following composition:

| | Percent |
|---|---|
| Nickel | 7.00 up to 80.00 |
| Chromium | 10.00 up to 30.00 |
| Carbon | .10 up to .80 |
| Manganese | .20 up to 1.00 |
| Silicon | .20 up to 3.00 |
| Calcium metal | .01 up to 2.00 |
| Molybdenum | .00 up to 1.50 |
| Zirconium | .00 up to 1.00 |
| Beryllium | .00 up to 3.00 |
| Tungsten | .00 up to 3.00 |
| Titanium | .00 up to 1.00 |

Iron by difference.

From the above, it will also be evident that, as a result of casting, it is possible to utilize steels of non-corrosive and stainless or rustless quality, in such manner as thereby to eliminate the delays and further defects and costs in plating operations.

Having regard to the urgency for greater blade production and the metal and alloy situation, and the melting capacity as a whole, however, steels of the following composition are preferred at this time, since the entire charge may consist of scraps of known composition:

| | | |
|---|---|---|
| Nickel | 8.00 to 12.00% | Prefer 12.00% |
| Chromium | 16.00 to 20.00% | Prefer 18.50% |
| Carbon | .10 to .25% | Prefer .20% |
| Manganese | .50 to .80% | Prefer .70% |
| Silicon | .60 to 1.00% | Prefer .70% |
| Molybdenum | .10 to .30% | Prefer .20% |

While the steel of the selected composition is being melted, the same is treated in an improved manner to transform it into a completely deoxidized and non-ebullient mixture, thus eliminating ebullition in the mold and the consequent problems, including the lappings or seams heretofore caused by ebullition in permanent molds, and arising from the impossibility of properly venting such a closed mold with sufficient rapidity to permit the escape of gas or pressure generated in the poured metal therein. This treatment of the metal before pouring is also such as to eliminate both microscopical and optical voids ordinarily caused by various non-metallic and gaseous elements and oxides, and such as to enable an increase in the cohesive strength of the metal, while also obtaining a new extreme fluidity of the metal and the retention of this new fluidity sufficiently long to permit effective casting of heretofore prohibitively thin sections to be obtained.

To obtain these results, the selected metal is treated during melting with calcium to form a non-ebullient pouring mixture, preferably utilizing a calcium deoxidizing mixture of the character described and claimed in a copending application Serial No. 417,169, filed October 30, 1941. For example, for steel melted in crucibles and induction furnaces, a mixture may be used comprising the following percentages of calcium metal, calcium silicide or calcium silicon, with ferro-manganese and ferro-silicon:

| | Percent |
|---|---|
| Calcium metal | .20 to .30 |
| Or calcium silicide | .20 to .40 |
| Or calcium silicon | .25 to .70 |
| With ferro-manganese | .20 to 1.00 |
| And ferro-silicon | .10 to 3.00 | while with the steels or irons melted in an electric arc furnace may be used, as a preferred amalgamating and cleansing process material, the following mixture:

| | Percent |
|---|---|
| Calcium metal | .10 to .30 |
| Or calcium silicide | .15 to .30 |
| Or calcium silicon | .20 to .50 |
| With ferro-silicon | .10 to .50 |
| And ferro-manganese | .20 to .75 |

Further, it will be understood that these mixtures preferably are used in the manner described and claimed in the above mentioned application, and in such manner as to leave a small residue of calcium as metal as described therein.

When the steel has been thus treated in such manner as to form a non-ebullient mixture of extreme and long-maintained fluidity, the same is poured into a permanent mold of an improved construction adapted to enable full advantage to be taken of the improved characteristics of the treated metal, and wherein improved sectional feeding is made possible in such manner that microscopical structure defects such as banding and carbide segregations are avoided because the crystal bodies at solidification are established in conformity with substantially the unmachined finished contour of the blade.

Referring more particularly to the illustrative form of mold shown in Figures 1 to 11 of the drawings, it will be noted that this mold is herein of the permanent mold type and adapted to deliver the poured metal in an improved manner to the various parts of the same and in such manner as to form the complete hollow blade of the desired conformation and having the portions of extremely thin section, solid tip, and hollow body, heretofore unobtainable by casting. As illustrated, it is also of the vertical pouring type adapted to stand vertically on end during pouring, as shown in Figure 1, and comprises a so-called main mold member 1 of improved construction, and an improved cooperating mold member 2, both adapted to enclose and cooperate with an improved core member 3, in such manner as to enable the molten metal to be poured vertically into a pouring inlet 4 in the top of the members 1 and 2 and form a complete blade while being vented only through a vent 5, likewise in the top of the mold adjacent the pouring inlet 4.

Referring more particularly to the mold members 1 and 2, it will be understood that the latter if desired, may be hinged at 2a, or otherwise suitably connected together, and that they are preferably formed of metal, although suitable clay or cement substances may be used if desired. In the form illustrated, they are also of dimensions adapted to form a standard 5 ft. 3 in. blade, shown in blank or untrimmed form in Figure 12, and adapted to be subsequently trimmed and finished into the desired standard external shape of blade shown in Figures 13 to 17.

The mold member 1 includes the inner main blade molding cavity portion 6 which conforms to the external contour of one side of the blade. As illustrated, this portion 6 communicates with the vent 5 through a shank forming portion 7 and with the pouring passage 4 through a series of gates including a bottom gate 8, a series of intermediate gates 9, and a top gate 10; these gates all being of an improved construction and separated from each other by a series of improved collapsible cores 11, 12, 13 and 14. Of these gates, the gate 8 leads to the thin tip forming portion 15 of the portion 6, while the gate 10 leads to the shank forming portion 7 and the gates 9 are distributed equally along the portion 6 between the gates 8 and 10, with all of these gates upwardly directed in such manner as to control the flow of the fluid metal during pouring in an improved manner, as hereinafter described. Further, it will be noted that the pouring passage 4 extends vertically along outside the several gates and near one marginal edge of the mold member 1 down to and below the gate 8, and that the fluid metal is delivered thereby into a suitable refractory pouring basin 16 herein having a suitable cupped upper surface 17 and also suitably seated in the base of the member 1. Attention is also directed to the series of spaced V-shaped openings 18, herein three in number and about $\tfrac{1}{8}$ inch deep at their widest portion and $\tfrac{1}{16}$ at their points, which are provided in the base of the member 1 and leading downward from the shallow blade tip forming portion 15 at the bottom of this member. It will also be noted that on the upper side of the top gate 10, an additional large core member 19 is provided, which may be either collapsible, or solid and formed as a permanent part of the mold, as shown, and which is so shaped as to cooperate to define walls of the pouring inlet 4, the gate 10 and the adjacent shank forming passage 7.

Referring to the collapsible cores 11, 12, 13 and 14, it will be observed that the cores 11, 12 and 13 are of the same construction and of substantially the same size, while the core 14 is also of the same general construction, but larger in size. Herein, these cores are preferably of baked sand structure and are of hollow rhomboidal form with one of their longitudinal walls grooved as at 11a to define an edge of the portion 6, and with their transverse end walls sloping at the appropriate angle to produce walls of the angularly upwardly directed gates 8, 9 and 10. Herein these cores 11, 12, 13 and 14 are each slipped over suitable core positioning members suitably carried on either the mold member 1 or cooperating mold member 2, and herein comprising spaced metal core positioning members 20 adapted to be received in and extend across diagonally opposite corners of the hollow rectangular cores, in such manner as, while accurately positioning the same, in no way to interfere with the collapsing of these frangible cores during solidification of the metal, as hereinafter described.

The complementary mold member 2 is of generally corresponding construction, so that a more detailed description of the same is not necessary; it being understood that the same, when fitted onto the mold member 1, will cooperate with the mold member 1 and the core 3 to produce a cast propeller blank of the construction shown in Figure 12. Here it will also be understood that if desired a bead and groove connection 21 may be provided around the raised marginal edges of the members 1 and 2, in such manner as to insure accurate registry of the members 1 and 2.

The core 3 has a body portion 22 corresponding to the desired hollow interior of the blade, and a tapered shank portion 23 corresponding to the hollow interior of the shank thereof, while it will also be noted that herein like oppositely directed lateral extensions 24 are provided on the upper end of this shank portion 23, and that these extensions are seated in suitable recesses 25 in the members 1 and 2, in such manner as thereby securely to locate the core 3 in the desired position, illustrated in Figures 1, 2, 3 and 6 to 8, between these members. With the core 3 comprising a solid baked sand core and thus positioned, it will be apparent that space will be provided around the same in such manner as to enable the fluid metal to fill the spaces around the core, as shown in the above figures and Figure 9, and in such manner as thereby to produce the blank for the propeller blade of the desired conformation shown in Figure 12. In this connection, it will be noted that the rigidity of the core 3 obtainable in a solid baked sand construction, and the disposition of the core in its vertical position with its supporting connections 24 and 25 at the top and of substantial size and securely positioned between the members 1 and 2, all contribute to the accurate positioning of the core 3, while producing a construction which facilitates the removal of the core.

In pouring, with the mold closed and hot and in vertical position, the non-ebullient fluid metal is poured at a temperature above 2900° F., and preferably above 3050° F., in such manner that the shrinkage and stresses set up previous to, and at, and immediately after solidification are at a maximum. The metal is evenly poured through the pouring passage 4 into the pouring basin 16 from which it passes through the gate 8 into the tip forming portion 15 and the V-shaped openings 18, in such manner as thereby to stabilize the basin of fluid metal as it enters the mold, and to assist in the equal division of the metal by the core, in such manner as to insure better concentricity. As the pouring continues, with the poured basin thus stabilized, and as the metal solidifies in the V-shaped openings 18, the level of the metal will rise in the portion 15 of the main mold, which is very thin, in such manner as to form the thin tip or tail of the blade while the flow continues through the gate 8. Thereafter, as the metal rises in the mold cavity substantially to the top of the bottom core 11, it will begin to enter through the adjacent upwardly inclined gate 9 and continue to fill up the space between the core 3 and the portion 6 in the mold members 1 and 2, the angle of the gate 8 and of the several gates 9 being such as to prevent entrance of the fluid metal through an upper gate, while passage of metal continues through a lower gate. Thereafter, the metal level will continue to rise progressively, flowing through the other upwardly inclined gates 9 under and then over the several collapsible cores 11, 12, 13, and 14, until flow through the gate 10 completes filling of the mold spaces 7 and 5. Further, it will be apparent that as solidification similarly moves progressively upward, the collapsible cores 11, 12, 13 and 14 will progressively collapse, each being adapted to collapse at a slight solidification pressure, for example, as the metal reaches a pressure of approximately one pound per square inch, all in such manner as thereby to permit shrinkage of the casting while avoiding fracture or semi-fractor during shrinking, or shrink cracks. This process will continue until the mold is filled, and the metal rises through the portion 7 to the desired height in the concentric conical portion 5; it being understood that the feed head is of sufficient volume to insure complete feeding in the latter to avoid shrink cracks, and that, if desired, suitable lateral ports such as the port 5a may be provided.

After the necessary cooling in the mold, the members 1 and 2 are separated and blank 12a shown in Figure 12 is removed from the mold, and first trimmed to the shape B illustrated in Figures 13 and 14, i. e., to substantially the unmachined finished form of the desired propeller blade with the hollow body $B^1$, shank $B^2$ and solid tail $B^3$, and thereafter machined or otherwise finished, as required.

As a result of the combined action of the improved non-ebullient pouring metal and of the improved sectional feeding thereof into the improved mold structure, it will be evident that pouring laps or folds will be prevented, while the collapse at slight pressure of the core sections separating the gates, will also prevent shrink cracks and internal semi-fractures. Further, it will be evident that the exceedingly thin sections comprising the blade casting may be satisfactorily cast in the closed or permanent mold, while producing an improved blade free from defects in the cast blade, arising from defects in the poured metal, or due either to ebullition, or to shrink cracks occurring during casting. Further, it will be apparent that the treated metal will retain its extreme fluidity for a sufficient time when in contact with the hot mold surfaces of the mold members and cores, while structural defects, such as banding and carbide segregations are avoided, and an improved structure of the crystal bodies is obtained at solidification in conformity with the contour of the casting, all at the same time that microscopical and optical voids are eliminated in such manner as markedly to increase the cohesive strength of the metal and resultant quality of the blade as regards performance under flight or combat conditions.

In addition to the above improved structure of the blades, it will also be evident that this improved casting process and apparatus not only makes it possible to use a wide variety of steels wholly incapable of use in previous operations requiring rolling and forging, but that the process of manufacture is materially expedited, while also markedly reducing both the equipment necessary and the labor required to produce a finished blade in a corresponding state of completion. Thus, it is made possible to increase by many times the possible production of such blades in a given time, while freeing very substantial quantities of skilled labor and equipment for other purposes, all in such manner as thereby to make it possible to relieve the present bottleneck conditions existing in the manufacture of airplane propeller blades. At the same time, it is also made possible to reduce the cost of these improved blades to between one and two-tenths of the cost of manufacture of inferior blades by previous methods. The invention also makes it possible to cast either copper alloy or aluminum alloy blades while continuing to obtain advantages of my improvements.

In Figure 18 has been illustrated a modified mold construction generally similar to that shown in Figure 1, save that the core 3 is of a metal reenforced type and supported at its bottom in the mold. As shown, this form of core includes a metal reenforcement in the form of an internal steel reenforcement strip 26. In a preferred construction, this strip 26 is of generally flat tapered construction, tapering from approximately ¼ inch in thickness at the portion 27 thereof which extends above the upper end of the mold, to a thickness of approximately 1/16 inch at the bottom portion 28 of the strip. Further, it will be understood that the lower end of this steel strip is covered with sand, and that the strip fits into a socket or recess 29 in the bottom of the mold. As shown, it also has a slot 30 in its lower end adapted to engage the shank of a sitable fixed screw 31 suitably carried by the base of the permanent mold in such manner as, while permitting relative reciprocation of the steel reenforcement member when the core 3 is inserted in the mold, to cause the member 3 to be securely positioned at its lower end in the latter. It will also be understood that a suitable slot 32 may be provided in the upper protruding end of the strip 26, in such manner as, if desired, to enable the use of a usual drift pin mechanism 32a to release or relieve the steel reenforcement 26 and thereby collapse the internal core in such manner as to resist surface checking of the inner surfaces. Obviously, while a tapered, generally flat, steel rod or bar is shown, bars or rods of other section may be used, but the flat type of bar is preferred since it is more readily removable quickly.

Such a blank as will be produced by this structure, will have an opening at the tail extending axially through the latter and equally on opposite sides of the center line, and, hence, some welding to close the end of this opening is required. However, the amount of welding required is minute as compared with previous practice, and it will also be noted that this welding need be only across the end of the slot and the tail can accordingly be hollow in such manner as substantially to stiffen the same while also lightening it. This form of my invention is also especially adapted to use where the presses or tool set-up to mechanically correct eccentricity are not available, in order to insure the necessary accurate commercial concentricity of the core and uniform cross section.

In Figure 20 has been shown another form of core support including any usual chaplets diagrammatically indicated at 33. In this construction, it will be understood that the chaplets should be of a metal which will fuse to the mother metal, and that the same are spaced from one another by the sand core. It is preferred to use metal for these chaplets of closely similar composition to that intended for the blade, so that the chaplet may become an integral part of the blade casting. In the use of such chaplets, it is found advisable to spot or otherwise weld the chaplet to the outer surface of the blade and thereafter grind the blade parallel to the blade surface.

For casting copper blades, the copper mix most desirable for this product appears within the following composition range:

|  | Per cent |
|---|---|
| Copper | 99.85 to 94.50 |
| Manganese | .03 to 1.00 |
| Beryllium | .10 to 3.50 |
| Silicon | .02 to 1.00 |

Calcium as a metal may be contained in the above range to .0001% to 1.00% by a proportionate reduction in copper.

Because 1.50% beryllium in copper in the presence of manganese, silicon and calcium, responds to heat treatment bettter, it is therefore more desirable for airplane propellers. By the amalgamating effect of the combination of calcium, silicon and manganese, there occurs greater cohesive strength at the grain boundary. It has also been discovered that with this combination, star or dentritic structure ornamentation is restricted; hence, embrittlement is avoided.

The desirable range found best up to this writing is as follows:

|  | Per cent |
|---|---|
| Copper | 98.80 to 98.00 |
| Manganese | .10 to .30 |
| Beryllium | 1.00 to 1.50 |
| Silicon | .05 to .15 |
| Calcium metal | .01 to .20 |

Difference may be additional beryllium or copper plus some immaterial impurities.

It should be noted that as in the case of steel, there is no restriction as to composition. For instance, a leaded or tin copper would serve as well as steel for many purposes when cast into hollow blades in a permanent mold. Similar freedom from restriction as to composition also applies to aluminum mixtures.

While herein have been specifically described certain embodiments of different phases of the invention, it will be understood that the same have been chosen for purposes of illustration and that other modifications may be made without departing from the invention or the scope of the appended claims.

What is claimed as new and desired to be secured by Letters Patent is:

1. In a molding apparatus for casting separate hollow blades for airplane propellers, a permanent mold having a mold cavity for forming the exterior of the blade and of reducing cross sectional area toward the tail of the blade, a pouring aperture extending along said cavity, and a series of collapsible gates leading from said aperture to said cavity and spaced along the latter, and a single core in said cavity for forming the hollow interior of the blade and also of reducing cross sectional area toward the tail of the blade, said cavity and core being vertically disposed and having their portions of minimum cross sectional area at the lower ends thereof.

2. In a molding apparatus for casting separate hollow blades for airplane propellers, a permanent mold having a mold cavity for forming the exterior of the blade and of reducing cross sectional area toward the tail of the blade, a pouring aperture extending along said cavity, a series of collapsible gates leading from said aperture to said cavity and spaced along the latter, and a single core in said cavity for forming the hollow interior of the blade and also of reducing cross sectional area toward the tail of the blade, said cavity and core being vertically disposed and having their portions of minimum cross sectional area at the lower ends thereof, and the walls of said cavity and said core also having gradually reducing space therebetween toward the tail of the blade to produce walls of gradually reducing thickness toward said tail.

3. The method of making an airplane propeller blade having a shank and a blade body integral therewith provided with thin edges and reduced in thickness to a thin tip, which comprises providing a casting mold having an elongated cavity to shape the blade, arranging the mold vertically with the tip-shaping portion lowermost, pouring the tip portion, and thereafter pouring the remainder of the article, the last-named pouring being effective to enter the metal into the mold cavity along an edge thereof which forms a side edge of the blade with the metal entering through a plurality of gates provided by hollow collapsible cores spaced along the side edge of the blade.

4. The method of making a hollow propeller blade having a shank and a blade body integral therewith provided with thin edges and reduced in thickness to a thin tip, which comprises providing a casting mold having an elongated cavity to shape the blade and open adjacent the shank-forming end, the mold being provided with a core supported in the open end, said core being spaced at its tip from the tip forming wall of the cavity and said cavity having recessed means to receive and anchor metal flowing around the tip of the core, arranging the mold vertically with the tip-shaping portion lowermost, pouring the tip portion, and thereafter pouring the remainder of the article progressively through gates in superimposed arrangement along the side of the mold cavity.

5. A mold for forming a hollow blade having a shank and a blade body integral therewith provided with thin edges and reduced in thickness to a thin tip, said mold having an elongated cavity to shape the blade and also having an open upper part adjacent the shank-forming portion of the cavity and provided with a metal inlet passage leading to the tip-forming portion of the cavity and with a plurality of hollow frangible cores forming gates arranged along the side edge portion of the cavity, said gates being inclined upwardly and inwardly.

6. A mold for forming a hollow blade having a shank and a blade body integral therewith provided with thin edges and reduced in thickness to a thin tip, said mold having an elongated cavity to shape the blade and also having an open upper part adjacent the shank-forming portion of the cavity and provided with a metal inlet passage leading to the tip-forming portion of the cavity and with a plurality of gates arranged along the side edge portion of the cavity, said gates being inclined upwardly and inwardly and being formed by and between collapsible cores of open rhomboidal formation.

7. The method of making a hollow propeller blade having a shank and a blade body integral therewith provided with thin edges reduced in thickness to a thin tip, which comprises providing a casting mold having an elongated cavity to shape the blade, said cavity being open to one end of the mold adjacent the shank forming portion of the cavity and being closed at the tip forming portion of the cavity, arranging a collapsible core having a shank and a blade portion within the cavity with the shank of the core supported in the open end of the mold, the core being arranged vertically with the shank forming portion uppermost, pouring molten metal from the side of the cavity into the tip portion, producing a positioning in the mold cavity of the element consisting of the tip portion of the core and the element consisting of the poured metal surrounding said tip portion by anchoring one of said elements to an adjacent recessed part of the mold, and thereafter pouring the remainder of the article through gates at the side of the mold cavity provided by and between hollow collapsible cores.

AVIS COLE DAVIDSON.
*Executrix of the Estate of Arthur C. Davidson, Deceased.*